United States Patent
Springett et al.

(10) Patent No.: US 10,057,160 B2
(45) Date of Patent: Aug. 21, 2018

(54) DATA ROUTING

(71) Applicant: METASWITCH NETWORKS LTD, Enfield (GB)

(72) Inventors: Phillip James Springett, Enfield (GB); Max Dymond, Enfield (GB); Ryan Peter Norris, Newbury (GB); Oliver Edward Pratt, Enfield (GB); George Malcolm Gilbert, Enfield (GB)

(73) Assignee: METASWITCH NETWORKS LTD, Enfield, Middlesex (GB)

( * ) Notice: Subject to any disclaimer, the term of this patent is extended or adjusted under 35 U.S.C. 154(b) by 190 days.

(21) Appl. No.: 15/073,491

(22) Filed: Mar. 17, 2016

(65) Prior Publication Data

US 2016/0277285 A1    Sep. 22, 2016

(30) Foreign Application Priority Data

Mar. 19, 2015    (GB) .................................. 1504685.7

(51) Int. Cl.
| | |
|---|---|
| *H04L 12/707* | (2013.01) |
| *H04L 12/24* | (2006.01) |
| *H04L 12/26* | (2006.01) |

(52) U.S. Cl.
CPC .......... *H04L 45/22* (2013.01); *H04L 41/0659* (2013.01); *H04L 43/0811* (2013.01)

(58) Field of Classification Search
CPC ... H04L 41/0659; H04L 43/0811; H04L 45/22
See application file for complete search history.

(56) References Cited

U.S. PATENT DOCUMENTS

| | | | | |
|---|---|---|---|---|
| 5,506,838 | A | * | 4/1996 | Flanagan ................ H04L 45/02 370/258 |
| 2003/0076840 | A1 | * | 4/2003 | Rajagopal ........... H04L 41/0213 370/395.21 |
| 2004/0202111 | A1 | | 10/2004 | Beshai et al. |
| 2005/0063312 | A1 | | 3/2005 | Liu |
| | | | (Continued) | |

FOREIGN PATENT DOCUMENTS

WO    2006128893 A1    12/2006

OTHER PUBLICATIONS

"Oracle Communications Session Border Controller" ACLI Configuration Guide; Release S-CX6.1.0, Oct. 2013.
(Continued)

*Primary Examiner* — Kashif Siddiqui
(74) *Attorney, Agent, or Firm* — EIP US LLP

(57) ABSTRACT

Measures for use in routing data in a data communications network. A request to route data to a given destination in the network is received. A route to the given destination is first selected from a plurality of routes to the given destination stored in a routing table. Routing the data to the given destination using the first selected route is attempted. In response to receipt of an indication that routing the data to the given destination via the first route failed, a second, different route to the given destination is second selected from the plurality of routes to the given destination stored in the routing table. The second selecting includes omitting, for the purposes of the second selection, at least one route to the given destination from the plurality of routes to the given destination stored in the routing table.

17 Claims, 4 Drawing Sheets

(56) References Cited

U.S. PATENT DOCUMENTS

2007/0230425 A1\* 10/2007 Zheng .................... H04L 45/34
                                                        370/338
2012/0320731 A1   12/2012 Johnson
2013/0177024 A1    7/2013 Hong

OTHER PUBLICATIONS

"Oracle Communications Session Border Controller" ACLI Reference Guide; Release S-C6.2.0, Oct. 2013.

\* cited by examiner

DATA ROUTING

CROSS-REFERENCE TO RELATED APPLICATIONS

This application claims priority under 35 U.S.C. § 119(a) to UK patent application no. GB 1504685.7, filed on 19 Mar. 2015, the entire content of which is hereby incorporated by reference.

BACKGROUND OF THE INVENTION

Field of the Invention

The present disclosure relates to data routing. In particular, but not exclusively, the present disclosure relates to routing data in a data communications network.

Description of the Related Technology

A network element (or 'network node') can use normal "Hunting" to try different routes to a destination, one after another, until one succeeds. Broadly, the network element selects a route from a routing table and attempts to use that route. If that route fails, the network element performs another lookup in the routing table to find the "next" route to try. This happens repeatedly until the selected route succeeds (or the network element runs out of routes to try, and the routing is failed).

SUMMARY

According to first embodiments, there is a method of routing data in a data communications network, the method comprising: receiving a request to route data to a given destination in the network; first selecting a first route to the given destination from a plurality of routes to the given destination stored in a routing table; attempting to route the data to the given destination using the first selected route; in response to receipt of an indication that routing the data to the given destination via the first route failed, second selecting a second, different route to the given destination from the plurality of routes to the given destination stored in the routing table, wherein the second selecting comprises omitting, for the purposes of the second selection, at least one route to the given destination from the plurality of routes to the given destination stored in the routing table, the omitting being carried out at least in part on the basis of the at least one route having at least one characteristic in common with the first route; and attempting to route the data to the given destination using the second selected route.

According to second embodiments, there is a system for use in routing data in a data communications network, the system comprising at least one memory including computer program code; and at least one processor in data communication with the at least one memory, wherein the at least one processor is configured to: receive a request to route data to a given destination in the network; first select a first route to the given destination from a plurality of routes to the given destination stored in a routing table; attempt to route the data to the given destination using the first selected route; in response to receipt of an indication that routing the data to the given destination via the first route failed, second select a second, different route to the given destination from the plurality of routes to the given destination stored in the routing table, wherein the second selecting comprises omitting, for the purposes of the second selection, at least one route to the given destination from the plurality of routes to the given destination stored in the routing table, the omitting being carried out at least in part on the basis of the at least one route having at least one characteristic in common with the first route; and attempt to route the data to the given destination using the second selected route.

According to third embodiments, there is a non-transitory computer-readable storage medium comprising computer-executable instructions which, when executed by a processor, cause a computing device to perform a method of routing data in a data communications network, the method comprising: receiving a request to route data to a given destination in the network; first selecting a first route to the given destination from a plurality of routes to the given destination stored in a routing table; attempting to route the data to the given destination using the first selected route; in response to receipt of an indication that routing the data to the given destination via the first route failed, second selecting a second, different route to the given destination from the plurality of routes to the given destination stored in the routing table, wherein the second selecting comprises omitting, for the purposes of the second selection, at least one route to the given destination from the plurality of routes to the given destination stored in the routing table, the omitting being carried out at least in part on the basis of the at least one route having at least one characteristic in common with the first route; and attempting to route the data to the given destination using the second selected route.

Further features of the present disclosure will become apparent from the following description of embodiments, given by way of example only, which is made with reference to the accompanying drawings.

DETAILED DESCRIPTION OF CERTAIN INVENTIVE EMBODIMENTS

Figure 1:
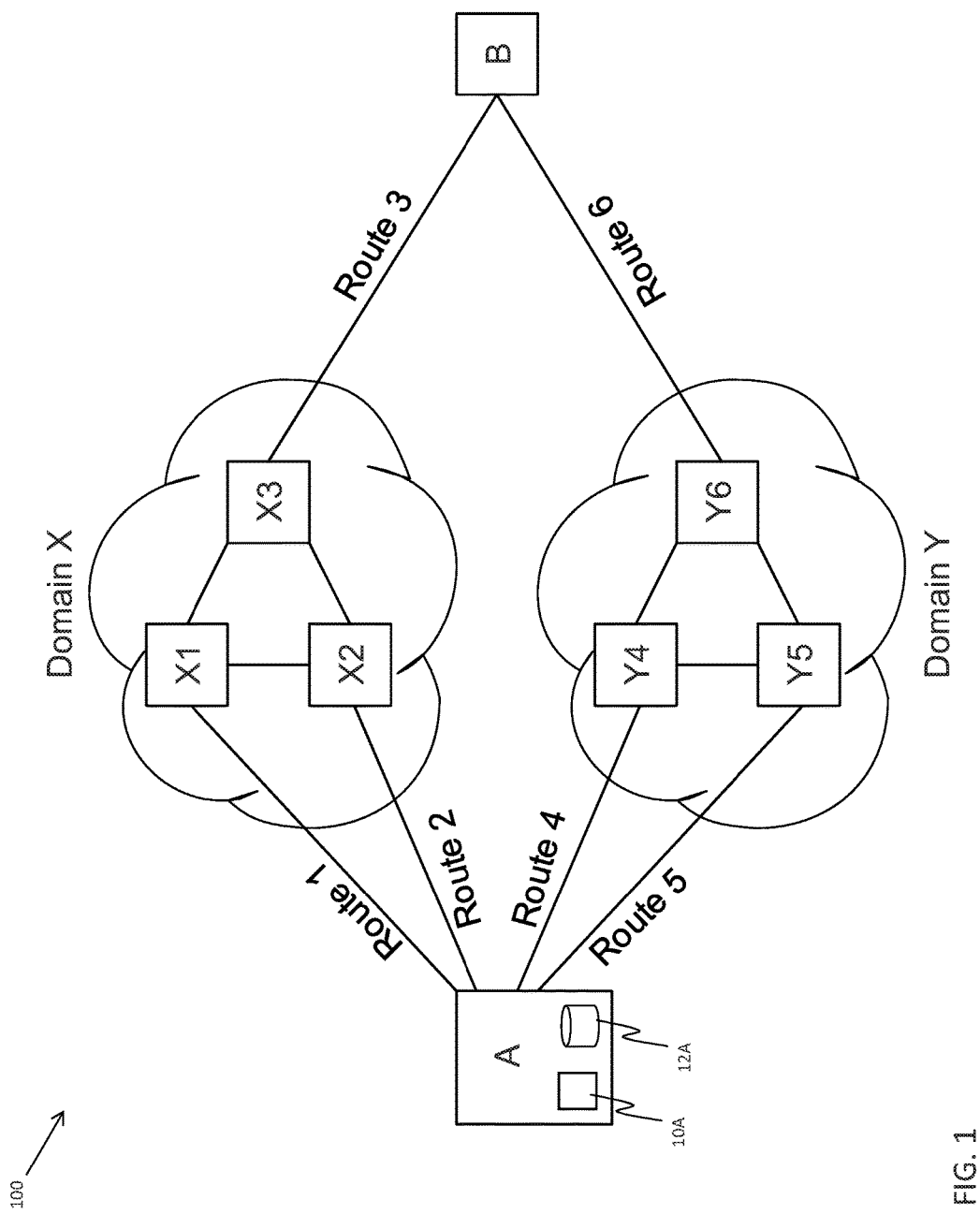
FIG. 1 shows a system diagram according to embodiments.

FIG. 1 shows a system diagram of a network 100 according to embodiments. In FIG. 1, network element A is trying to route data to a destination in the network, in this case network element B. Network element A has a choice of four possible routes to try; two routes via Domain X (routes 1 and 2), and two routes via Domain Y (routes 4 and 5). Network element A comprises a processor (or 'processing system') for performing various data processing tasks according to embodiments. Network element A comprises a memory 12A for storing data such as routing table data.

Figure 2:
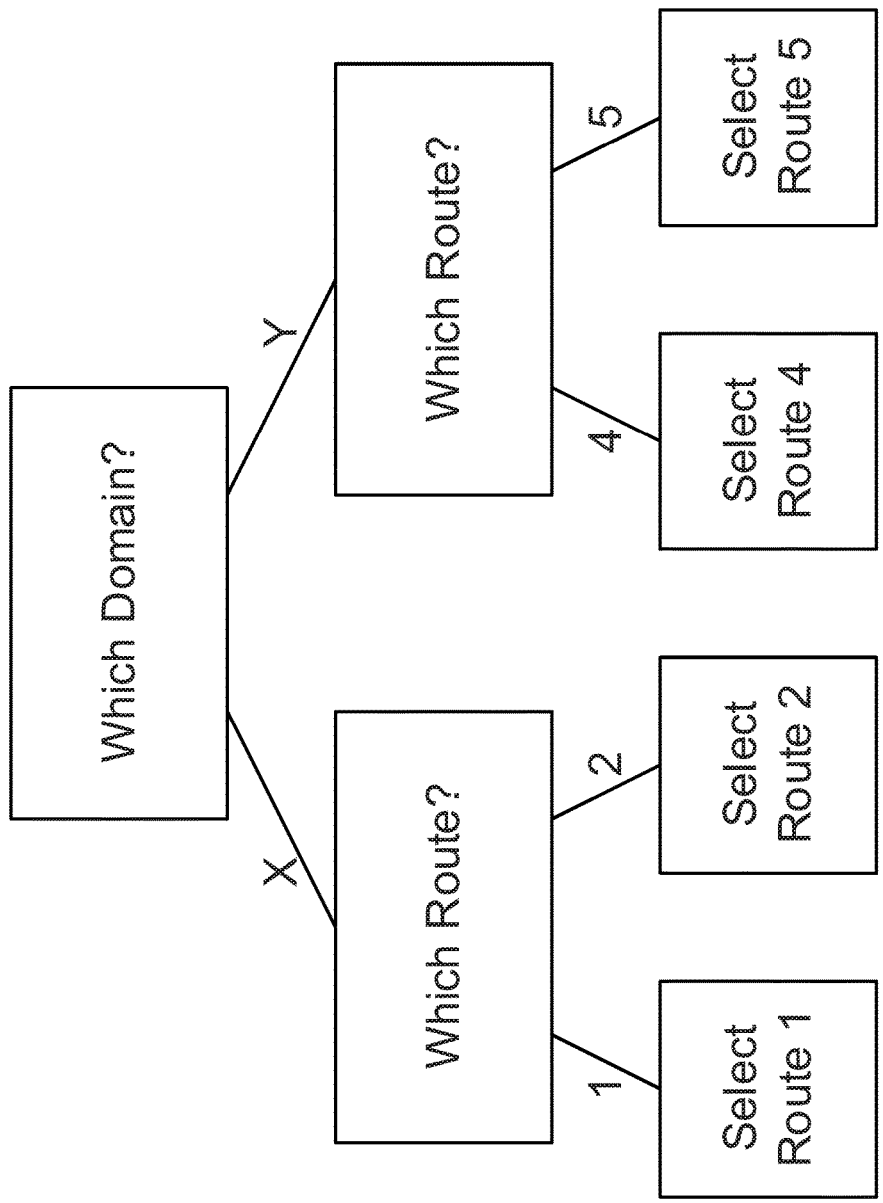
FIG. 2 shows a tree structure according to embodiments.

FIG. 2 shows a tree structure according to embodiments. In particular, FIG. 2 shows a representation of a routing table having a plurality of routes in the form of a tree structure comprising a plurality of nodes.

In embodiments, network element A is configured with the routing table of FIG. 2 (evaluated from top to bottom). Network element A first selects which domain to use, then selects which route within that domain.

Note that the basis on which the selecting decisions are made is not important to the hunting process. As one example, the domain could be determined by an electronic number mapping system (ENUM) lookup (which returns an ordered list of domains to try—e.g. X then Y), and the routes within each domain could either be determined by the Name Authority Pointer (NAPTR) records within the ENUM lookup or by some other operator configurable preference (e.g. cost or quality).

According to embodiments, the size and shape of the tree structure is not important. The above example demonstrates various benefits of embodiments of the present disclosure; as more layers are added and/or more options are added at each layer, embodiments will equally apply.

According to embodiments, the type of network element type is also not important. In some embodiments, the network element comprises a session border controller (SBC) network element, whereas in other embodiments the same logic could apply to any other network element such as a switch.

Figure 3:
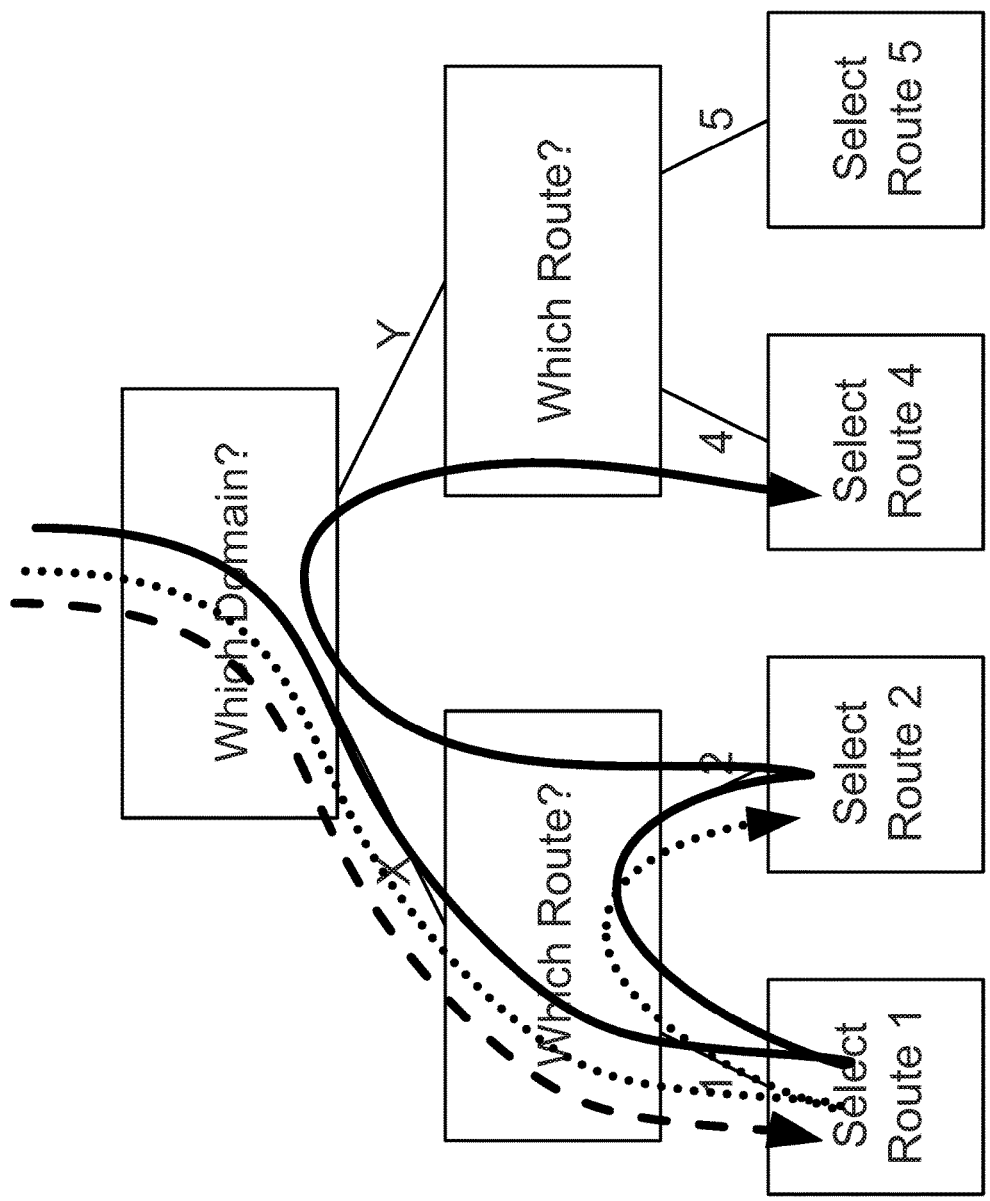
FIG. 3 shows a tree structure according to embodiments.

FIG. 3 shows a tree structure according to embodiments. In particular, FIG. 3 shows operation of a 'basic' hunting process on an example routing table.

First (dashed line/arrow), the routing table is traversed and route 1 is selected.

Route 1 is then tried, but fails.

Next, (dotted line/arrow), the routing table is traversed and route 1 is selected. However, route 1 is discounted (i.e. not considered a viable routing option) as having failed, and the process backtracks to the parent node in the tree and selects the next option, which is route 2.

Route 2 is then tried, but fails.

Next, (solid line/arrow), the routing table is traversed and route 1 is selected. However, route 1 is discounted as having failed, and the process backtracks to the parent node in the tree and selects route 2. However, route 2 is discounted as having failed and the process backtracks to the parent node. The parent node has had all its child nodes discounted so the process backtracks again to the next parent node, and then route 4 is selected.

Embodiments comprise improved measures, including methods, apparatus and computer programs for use in data packet routing. Embodiments seek to minimize the number of retries required to find a route that succeeds both to reduce the elapsed time before an attempt succeeds and the amount of processing required to do so.

Embodiments introduce a new concept of an "anchor" node which may be operator configurable. For each child node below an anchor node, all the routes are considered "similar" and therefore if one of the routes under the child fails, then all of the routes under that child are likely to fail as well. When hunting, "similar" nodes can therefore be skipped completely to maximize the chance of finding a successful route quickly and with minimal processing effort.

Embodiments comprise measures for use in routing data in a data communications network. Such measures may be referred to as enabling fast fail hunting. At a network element, a request to route data to a given destination in the network is received. The network element first selects a first route to the given destination from a plurality of routes to the given destination stored in a routing table. The network element then attempts to route the data to the given destination using the first selected route. In response to receipt of an indication that routing the data to the given destination via the first route failed, the network element second selects a second, different route to the given destination from the plurality of routes to the given destination stored in the routing table. In such embodiments, the second selecting comprises omitting, for the purposes of the second selection, at least one route to the given destination from the plurality of routes to the given destination stored in the routing table.

The omitting is carried out at least in part on the basis of the at least one route having at least one characteristic in common with the first route. The network element then attempts to route the data to the given destination using the second selected route.

Embodiments comprise representing the plurality of routes to the given destination stored in the routing table as a tree structure comprising a plurality of nodes; in such embodiments, the at least one characteristic in common comprises the representation of the at least one route in the tree structure comprising at least one node which is in common with the representation of the first route in the tree structure.

Embodiments comprise representing the plurality of routes to the given destination stored in the routing table as a tree structure comprising a plurality of nodes; in such embodiments, the first selecting comprises a first traversal of the tree structure, the first traversal comprises traversal of at least one predefined anchor node comprised in the plurality of nodes, and the at least one characteristic in common comprises the representation of the at least one route in the tree structure comprising at least one node which is a descendent node of the at least one predefined anchor node.

In embodiments, for each child node below the at least one predefined anchor node in the tree structure, all of the routes represented in the tree structure below a respective child node are considered similar such that if one of the routes represented in the tree structure below a respective child node fails, then all of the routes under a respective child node are also likely to fail.

In embodiments, the at least one characteristic in common comprises the representation of the at least one route in the tree structure comprising at least one node which is a child node of the at least one predefined anchor node.

In embodiments, the second selecting comprises a second traversal of the tree structure, and the second traversal comprises traversal to the at least one predefined anchor node, but not to a given child node of the at least one predefined anchor node.

In embodiments, the second selecting comprises a second traversal of the tree structure, and the second traversal comprises traversal to the at least one predefined anchor node, but not to a given child node of the at least one predefined anchor node or to any descendent nodes of the given child node.

Figure 4:
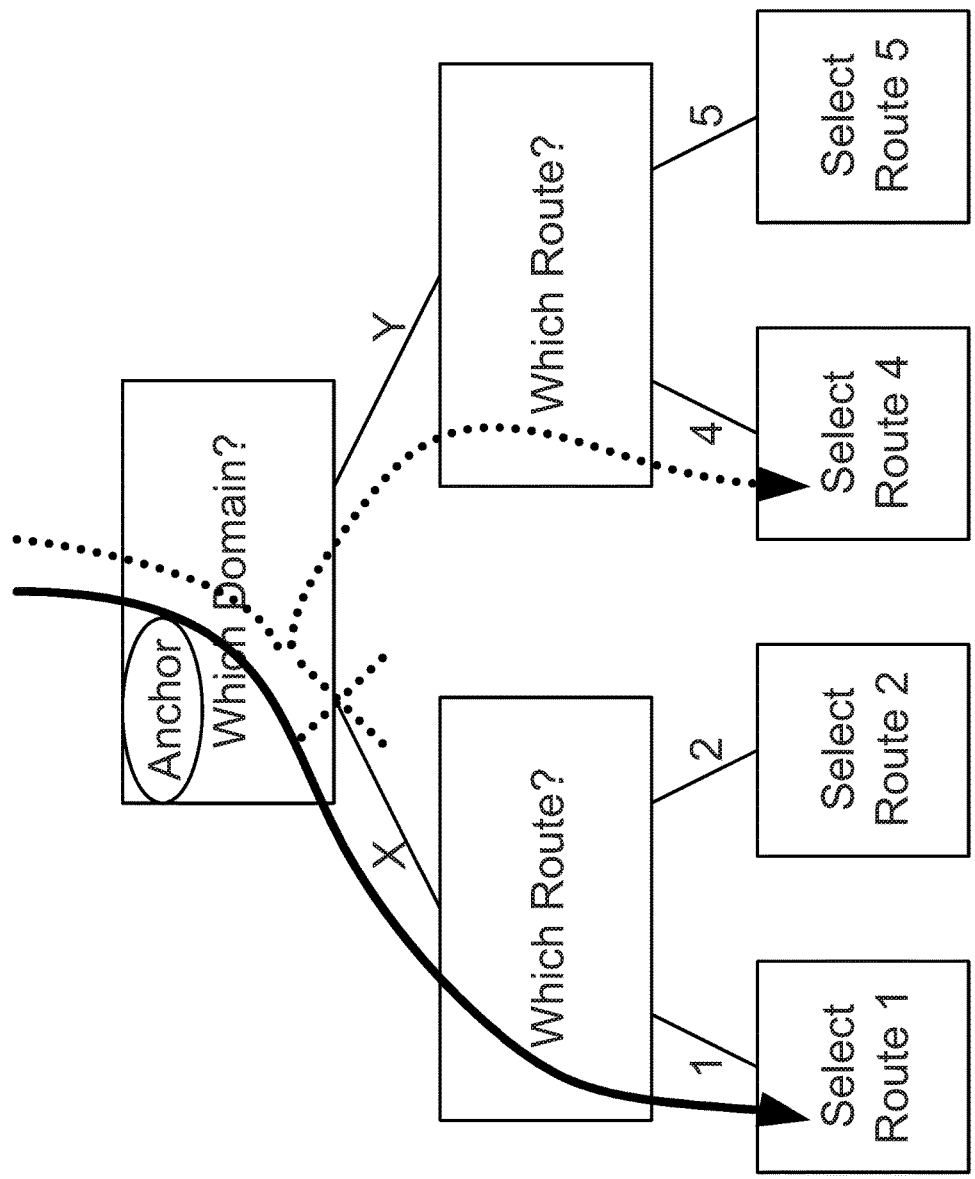
FIG. 4 shows a tree structure according to embodiments.

FIG. 4 shows a tree structure according to embodiments. In particular, FIG. 4 shows operation of an improved hunting process on an example routing table.

First (solid line/arrow), the routing table is traversed and route 1 is selected. As part of the traversal, the network element notes the passing of an anchor node and the child node that was selected thereafter (i.e. domain X).

Route 1 is then tried, but fails.

Next (dotted line/arrow), the routing table is traversed and at the anchor node the network element recalls that selecting the domain X child node led to failure and discounts the option to select that child node (and also all of its descendents) in its entirety. It then selects the next available route, which in this example is route 4.

In further embodiments, two hunting processes (basic, and improved) can be combined to create powerful new routing configurations by selecting which process to use based on the reason why the previously selected route failed.

Embodiments comprise first determining that the received failure indication is of a first type, wherein the second selecting is carried out at least in part on the basis of the first determination.

Embodiments comprise second determining that the received failure indication is of a second type, and in response to the second determination, overriding the omitting such that the at least one route is not omitted for the purposes of the second selection.

In embodiments, the received failure indication of the first type comprises an indication that there is a connectivity problem with a given domain in the network. In some such embodiments, the received failure indication of the first type comprises a Session Initiation Protocol (SIP) 404 'Not found' response code.

In embodiments, the received failure indication of the second type comprises an indication that there is a connectivity problem with a given server in the network. In some such embodiments, the received failure indication of the second type comprises a Session Initiation Protocol (SIP) 503 'Service unavailable' response code.

For example, when routing SIP messages, if the selection of route 1 led to a SIP 503 ("Service unavailable") response code, this may be indicative of server X1 undergoing maintenance or being temporarily overloaded such that attempting route 2 (via server X2) may well succeed. In this scenario basic hunting may be appropriate.

If however, the selection of route 1 led to a SIP 404 ("Not found") response code, this may be indicative of a much wider problem with Domain X's connectivity to the destination network element B. In this scenario, basic hunting would not be appropriate (as route 2 is likely to fail) and it would be more efficient to use the fast fail hunting and immediately move on to trying route 4 via domain Y.

In embodiments, the first route, the second route and the at least one route are logically distinct from each other.

In embodiments, the routes under an anchor node are all logically distinct. Embodiments involve detecting routing failures on one or more distinct routes and recovering by trying another distinct route, having bypassed other routes which are assumed will also fail. Note that such bypassed routes may not necessarily fail, but embodiments take a gamble and decide to move on to try other route(s) which, it is presumed, have a better probability of success.

In embodiments, anchor nodes can be configured anywhere in the routing table hierarchy, not just in a leaf node. Embodiments allow routing to continue after a "fast-fail", thus allowing hunting across multiple groups, and more complex set-ups with multiple anchors in the routing tree allowing complex pruning of different branches, and hunting between different sections of the routing hierarchy.

In embodiments, a user (such as a network operator) can mark certain routing decisions as being critical to the routing which implicitly groups together any distinct next-hops below that decision.

Embodiments also allow for more complex scenarios, such as the labelling of multiple nodes within the tree as being "anchors" and/or route selections that are multiply connected (e.g. they can be selected by traversing a routing table in two ways, one of which goes via an "anchor" node, and one of which does not/or does, but via a different "anchor" node).

In embodiments, the predefinition of which node comprises the at least one predefined anchor node is network operator configurable. A network operator can configure more than one anchor point in a representation of a routing table.

One or more of the aspects of the embodiments described herein with reference to the drawings comprise processes performed by one or more network elements or network nodes. In embodiments, the one or more network elements comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of routing data in a data communications network, the method comprising:

receiving a request to route data to a given destination in the network;

representing a plurality of routes to the given destination stored in a routing table as a tree structure comprising a plurality of nodes;

first selecting a first route to the given destination from the plurality of routes to the given destination stored in the routing table, wherein the first selecting comprises a first traversal of the tree structure, and wherein the first traversal comprises traversal of at least one predefined anchor node comprised in the plurality of nodes;

attempting to route the data to the given destination using the first route;

in response to receipt of an indication that the routing of the data to the given destination via the first route failed, second selecting a second, different route to the given destination from the plurality of routes to the given destination stored in the routing table, wherein the second selecting comprises omitting, for the purposes of the second selection, at least one route to the given destination from the plurality of routes to the given destination stored in the routing table, the omitting being carried out at least in part on the basis of the at least one route having at least one characteristic in common with the first route, wherein the at least one characteristic in common comprises a representation of the at least one route in the tree structure comprising at least one node which is in common with a representation of the first route in the tree structure, and which is a descendent node of the at least one predefined anchor node; and attempting to route the data to the given destination using the second selected route.

2. The method of claim 1, wherein for each child node below the at least predefined anchor node in the tree structure, all of the routes represented in the tree structure below a respective child node are considered similar such that if one of the routes represented in the tree structure below the respective child node fails, then all of the routes under the respective child node are also likely to fail.

3. The method of claim 1, wherein the at least one characteristic in common comprises the representation of the at least one route in the tree structure comprising at least one node which is a child node of the at least one predefined anchor node.

4. The method of claim 1, wherein the second selecting comprises a second traversal of the tree structure, and
wherein the second traversal comprises traversal to the at least one predefined anchor node, but not to a given child node of the at least one predefined anchor node.

5. The method of claim 1, wherein the second selecting comprises a second traversal of the tree structure, and
wherein the second traversal comprises traversal to the at least one predefined anchor node, but not to a given child node of the at least one predefined anchor node or to any descendent nodes of the given child node.

6. The method of claim 1, wherein the first route, the second route and the at least one route are logically distinct from each other.

7. The method of claim 1, wherein the predefinition of which node comprises the at least one predefined anchor node is network operator configurable.

8. The method of claim 1, wherein the method is performed by a network element.

9. The method of claim 8, wherein the network element comprises a session border controller (SBC).

10. The method of claim 8, wherein the network element comprises a switch.

11. A system for use in routing data in a data communications network, the system comprising at least one memory including computer program code, and
at least one processor in data communication with the at least one memory, wherein the at least one processor is configured to:
receive a request to route data to a given destination in the network;
represent a plurality of routes to the given destination stored in a routing table as a tree structure comprising a plurality of nodes;
first select a first route to the given destination from the plurality of routes to the given destination stored in the routing table, wherein the first selecting comprises a first traversal of the tree structure, and wherein the first traversal comprises traversal of at least one predefined anchor node comprised in the plurality of nodes;
attempt to route the data to the given destination using the first route;
in response to receipt of an indication that the routing of the data to the given destination via the first route failed, second select a second, different route to the given destination from the plurality of routes to the given destination stored in the routing table,
wherein the second selecting comprises omitting, for the purposes of the second selection, at least one route to the given destination from the plurality of routes to the given destination stored in the routing table, the omitting being carried out at least in part on the basis of the at least one route having at least one characteristic in common with the first route, wherein the at least one characteristic in common comprises the representation of the at least one route in the tree structure comprising at least one node which is in common with the representation of the first route in the tree structure, and which is a descendent node of the at least one predefined anchor node; and
attempt to route the data to the given destination using the second selected route.

12. A non-transitory computer-readable storage medium comprising computer-executable instructions which, when executed by a processor, cause a computing device to perform a method of routing data in a data communications network, the method comprising:
receiving a request to route data to a given destination in the network;
representing a plurality of routes to the given destination stored in a routing table as a tree structure comprising a plurality of nodes,
first selecting a first route to the given destination from the plurality of routes to the given destination stored in the routing table, wherein the first selecting comprises a first traversal of the tree structure, and wherein the first traversal comprises traversal of at least one predefined anchor node comprised in the plurality of nodes;
attempting to route the data to the given destination using the first route;
in response to receipt of an indication that the routing of the data to the given destination via the first route failed, second selecting a second, different route to the given destination from the plurality of routes to the given destination stored in the routing table,
wherein the second selecting comprises omitting, for the purposes of the second selection, at least one route to the given destination from the plurality of routes to the given destination stored in the routing table, the omitting being carried out at least in part on the basis of the at least one route having at least one characteristic in common with the first route, wherein the at least one characteristic in common comprises the representation of the at least one route in the tree structure comprising at least one node which is in common with the representation of the first route in the tree structure, and which is a descendent node of the at least one predefined anchor node; and
attempting to route the data to the given destination using the second selected route.

13. A method of routing data in a data communications network, the method comprising:
receiving a request to route data to a given destination in the network;
first selecting a first route to the given destination from a plurality of routes to the given destination stored in a routing table;
attempting to route the data to the given destination using the first route;
receiving an indication that the routing of the data to the given destination via the first route failed;
first determining that the received failure indication is of a first type;
in response to the receipt of the indication that routing the data to the given destination via the first route failed, second selecting a second, different route to the given destination from the plurality of routes to the given destination stored in the routing table, wherein the second selecting is carried out, based at least in part, on the first determination, and wherein the second selecting comprises omitting, for the purposes of the second selection, at least one route to the given destination from the plurality of routes to the given destination stored in the routing table, the omitting being carried out, based at least in part, on the at least one route having at least one characteristic in common with the first route;

second determining that the received failure indication is of a second type, and in response to the second determination, overriding the omitting such that the at least one route is not omitted for the purposes of the second selection; and attempting to route the data to the given destination using the second selected route.

14. The method of claim 13, wherein the received failure indication of the first type comprises a Session Initiation Protocol (SIP) 404 'Not found' response code.

15. The method of claim 13, wherein the received failure indication of the second type comprises an indication that there is a connectivity problem with a given server in the network.

16. The method of claim 13, wherein the received failure indication of the second type comprises a Session Initiation Protocol (SIP) 503 'Service unavailable' response code.

17. A method of routing data in a data communications network, the method comprising:

receiving a request to route data to a given destination in the network;

first selecting a first route to the given destination from a plurality of routes to the given destination stored in a routing table;

attempting to route the data to the given destination using the first route;

in response to receipt of an indication that the routing of the data to the given destination via the first route failed, first determining that the received failure indication comprises a Session Initiation Protocol (SIP) 404 'Not found' response code:

second selecting a second, different route to the given destination from the plurality of routes to the given destination stored in the routing table, wherein the second selecting is carried out based at least in part on the first determination, and wherein the second selecting comprises omitting, for the purposes of the second selection, at least one route to the given destination from the plurality of routes to the given destination stored in the routing table, the omitting being carried out based at least in part on the at least one route having at least one characteristic in common with the first route; and attempting to route the data to the given destination using the second selected route.

\* \* \* \* \*